United States Patent [19]

Meyn

[11] Patent Number: 4,581,789
[45] Date of Patent: Apr. 15, 1986

[54] APPARATUS FOR CUTTING-OFF A PART FROM SLAUGHTERED POULTRY

[76] Inventor: Pieter Meyn, Noordeinde 68C, 1511 AE Oostzaan, Netherlands

[21] Appl. No.: 692,303

[22] Filed: Jan. 17, 1985

[30] Foreign Application Priority Data

Jan. 18, 1984 [NL] Netherlands .................. 8400170

[51] Int. Cl.[4] ............................................. A22C 21/06
[52] U.S. Cl. ......................................................... 17/11
[58] Field of Search ............... 17/11 A, 11 B, 11 G, 17/11 C, 58

[56] References Cited

U.S. PATENT DOCUMENTS

| | | | |
|---|---|---|---|
| 3,104,418 | 9/1963 | Segur | 17/11 |
| 4,262,387 | 4/1981 | Scheier et al. | 17/11 |
| 4,265,001 | 5/1981 | Hathorn et al. | 17/11 |
| 4,266,322 | 5/1981 | van Mill | 17/11 |
| 4,382,314 | 5/1983 | Graham | 17/11 |
| 4,418,444 | 12/1983 | Meyn et al. | 17/11 |
| 4,467,500 | 8/1984 | Olson | 17/11 |
| 4,486,920 | 12/1984 | Tieleman et al. | 17/11 |

FOREIGN PATENT DOCUMENTS

| | | | |
|---|---|---|---|
| 1213202 | 1/1959 | France | 17/44 |
| 7606869 | 10/1976 | Netherlands | 17/11 |

Primary Examiner—John Sipos
Assistant Examiner—Donald R. Studebaker
Attorney, Agent, or Firm—Dority & Manning

[57] ABSTRACT

The apparatus for cutting-off a part from slaughtered poultry comprising a suspension conveyor with hooks from which the poultry is suspendable with its ankle-joints, further comprising a cutting device for cutting-off said poultry part according to the invention is characterized by at least one positioning and tensioning assembly synchronously movable with the suspension conveyor for positioning and tensioning the poultry in relation to the cutting device, wherein this positioning and tensioning assembly is provided with a spine adapted to engage the backbone of the poultry, said spine or elongated member being displaceable relative to the suspension conveyor and being capable of being inserted from above into the abdominal cavity of the poultry, said assembly further being provided with a tensioning bracket adapted to engage the sternum of the poultry, said bracket being displaceable relative to the suspension conveyor and being capable of being inserted from above into the abdominal cavity of the poultry and being displaceable relative to the spine between a rest position and a tensioning position.

21 Claims, 6 Drawing Figures

APPARATUS FOR CUTTING-OFF A PART FROM SLAUGHTERED POULTRY

The invention relates to an apparatus for cutting-off a part from slaughtered poultry comprising a suspension conveyor with hooks from which the poultry is suspendable with its ankle-joints, further comprising a cutting device for cutting-off said poultry part.

In a known apparatus of this type the slaughtered poultry is conveyed by the conveyor while being suspended with its ankle-joints in conveying hooks. It is usual to cut slaughtered poultry, of which the feathers, entrails, head, neck and for-legs already have been removed, into certain parts. The cutting operation has been automatized for a great number of these parts, but for other parts automatization has not been successful until now.

One of these parts, where automatization has not yet been successful until now is the so-called top-breast of the poultry. This top-breast forms the upper part of the breast of the poultry suspended with its ankle-joints in conveyor hooks. As seen in this position the upper part of the sternum consists of cartilage while the lower part consists of chalky bone. As seen downwardly from the cartilage at first a pair of floating ribs and subsequently the other pairs of ribs, coming from the backbone, are secured to the sternum.

Some of these parts, especially the top-breast, are often precisely specified by buyers of poultry parts. Thus the top-breast defines the part of the breast that is obtained after cutting through the sternum adjacent the attachment of the ribs, wherein the chalky bone section has a certain more specifically mentioned length and wherein the remainders of the floating ribs are visible in the flesh symmetrically and loosened from the sternum.

Until now it has just nearly been impossible to fulfil this demands while applying an automatized cutting operation. Therefore until now cutting-off the top-breast of poultry is only possible by application of handwork, this not only being workconsuming and expensive, but also generating great differences in the quality of the cut-off part.

It is an object of the invention to provide an apparatus of said type enabling the automatized cutting-off of the top-breast, independently from the size of the slaughtered poultry hanging on the suspension conveyor and without the mentioned drawbacks.

Therefore the apparatus according to the invention is characterized by at least one positioning and tensioning assembly synchronously movable with the suspension conveyor for positioning and tensioning the poultry in relation to the cutting device, wherein this positioning and tensioning assembly is provided with a spine or elongated member adapted to engage the backbone of the poultry said spine being displaceable relative to the suspension conveyor and being capable of being inserted from above into the abdominal cavity of the poultry, said assembly further being provided with a tensioning bracket adapted to engage the sternum of the poultry, said bracket being displaceable relative to the suspension conveyor and being capable of being inserted from above into the abdominal cavity of the poultry and being displaceable relative to the spine between a rest position and a tensioning position.

As a result all poultry can be presented to the cutting device in an almost identical way, so that the quality of the cut-off part nearly remains constant. Because every positioning and tensioning assembly is moved synchronously with the conveyor the cutting operation can be carried out without stopping the conveyor.

According to a preferred embodiment of the apparatus according to the invention the spine and the tensioning bracket are mounted on a carriage that is displaceable in relation to the suspension conveyor between an upper position, in which the spine and the tensioning bracket are out of the abdominal cavity of the poultry, and a lower position, in which the spine and the tensioning bracket are within said abdominal cavity.

As a result the spine and the tensioning bracket are displaceable into and out of the abdominal cavity in a simple but effective way.

An important embodiment of the apparatus according to the invention is characterized in that the positioning and tensioning assembly further comprises a carrying handle that is displaceable relative to the suspension conveyor and that has an opening receiving the neck stub of the poultry in the lowermost position of the spine in the lowermost position of the carriage.

This carrying handle co-operates with the spine for position the lower part of the poultry.

In a further embodiment the carriage can comprise a downwardly extending rod that continuously extends downwardly through the opening in the carrying handle, and that forms an additional support member for the poultry.

In still a further preferred embodiment of the apparatus according to the invention the carrying handle is mounted on a second carriage that is positioned below said carriage and is displaceable relative to the suspension conveyor between a lower position, in which the carrying handle does not engage the poultry suspended on its ankle-joints, and an upper position, in which the carrying handle engages the lower part of the poultry.

Together therewith the spine can comprise at its lower end an elongated rounded enlarged head that fits into the neck opening of the poultry as well as a short bent strip extending almost perpendicularly to said head and preventing the head of the spine from shooting through the neck opening of the poultry suspended on its ankle-joints in the lowermost position of the first mentioned carriage.

For obtaining the desired cut, according to an embodiment of the invention it is suggested that the position of the cutting knife relative to the positioning and tensioning assembly in its cutting position is such that the cutting knife contacts the poultry suspended on its ankle-joints in a cutting-engagement between the spine and tensioning bracket positioned in the poultry, while said bracket is in its tensioning position.

The invention will hereafter be explained further in connection with the drawing showing an embodiment of an apparatus according to the invention for cutting-off a part from slaughtered poultry.

Figure 1:
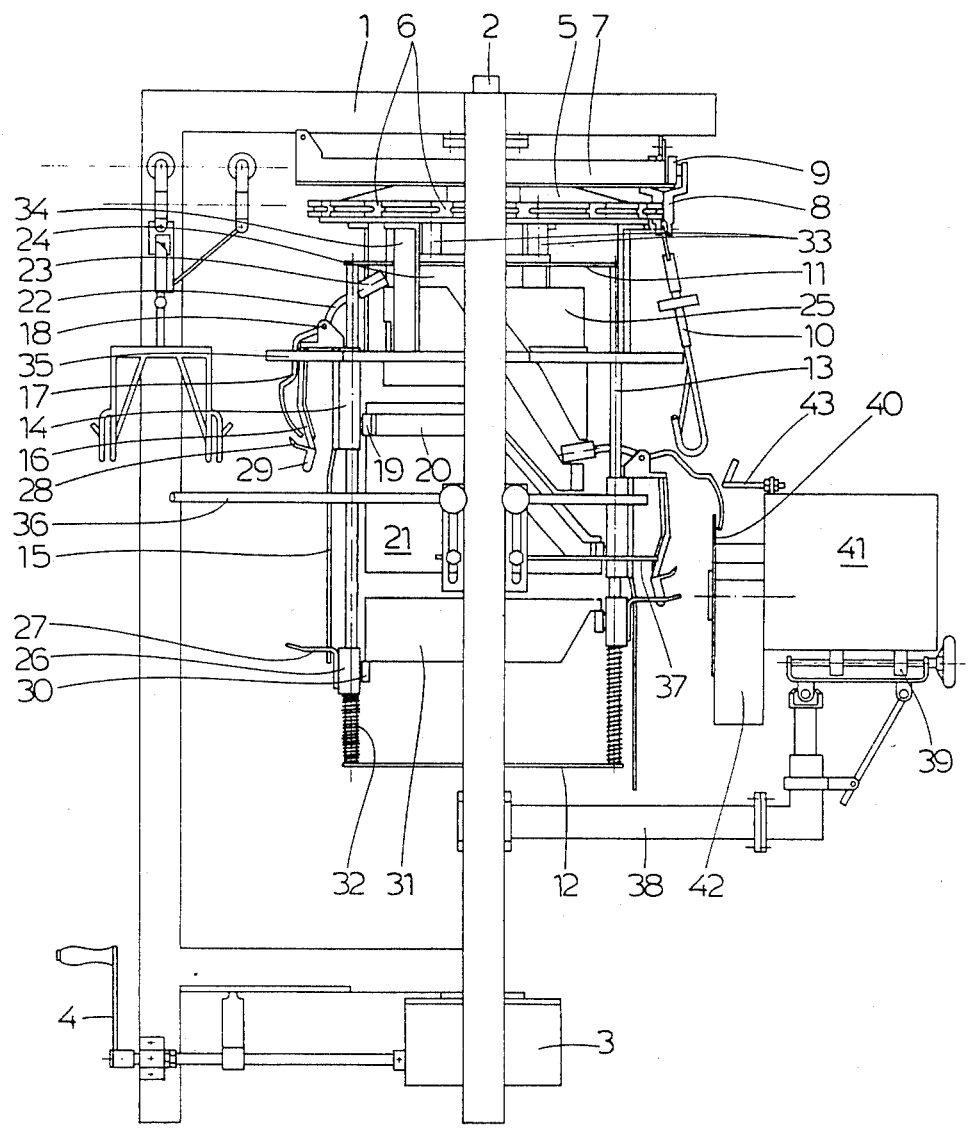
FIG. 1 shows a side elevational view of an embodiment of the apparatus according to the invention.
Figure 2:
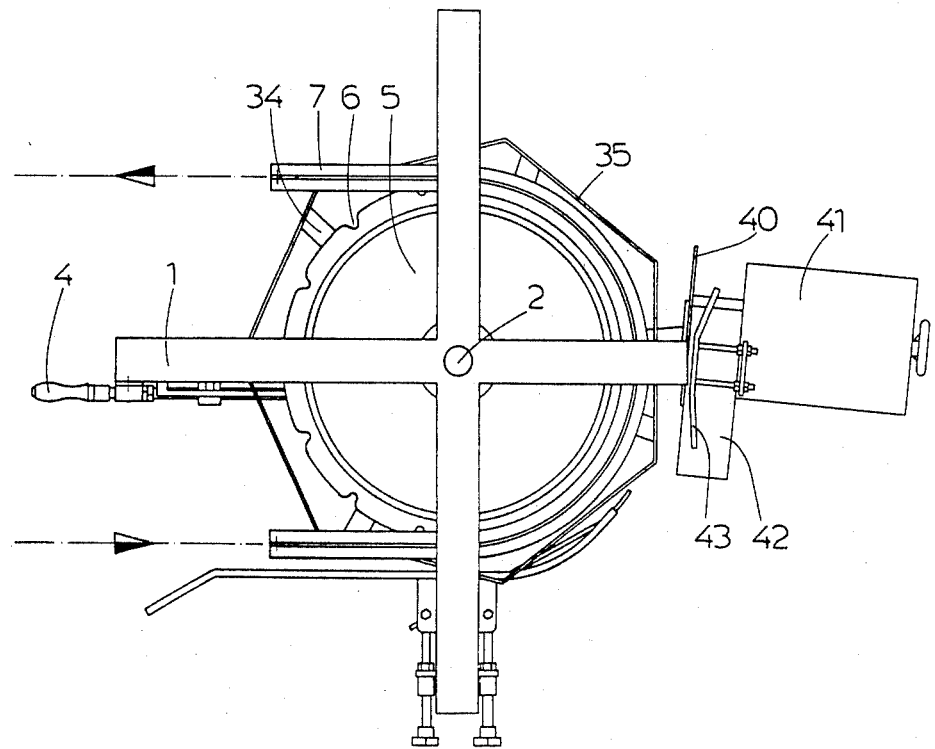
FIG. 2 shows a top view of the apparatus of FIG. 1.

The drawing shows an embodiment of an apparatus according to the invention adapted for cutting-off the top-breast of slaughtered poultry.

The illustrated apparatus consists of a frame 1, comprising a vertical non-rotating central shaft 2 that can be adjusted in height by a worm screw jack box 3 through a hand crank 4.

On the central shaft 2 of the frame 1 a drive wheel 5 is journalled comprising a number of recesses 6 regularly distributed along its circumference. A support rail 7 extending in part concentrically with respect to a part of the drive wheel 5 is secured to the frame 1 and joins a support rail of a suspension conveyor of which the carrying handles 8 are led on the support rail 7 by rolls 9.

The carrying handles 8 fall into the recesses 6 of the drive wheel 5. Secured to these carrying handles 8 are conveyor hooks 10, on which the poultry can be hung with its ankle-joints.

On the static vertical central shaft 2 an upper horizontal plate 11 and a lower horizontal plate 12 are journalled, said plates being not displaceable in vertical direction relative to said shaft 2 and being connected through vertical rods 13 regularly distributed along the circumference and extending in pairs to form a cage.

Slidably but not rotatably an upper carriage 14 is mounted on each pair of rods 13. A downwardly extending rod 15 and a spine or elongated member 16 are firmly secured to this upper carriage 14. A tensioning bracket 17 is connected with this spine 16 to pivot about a horizontal axis 18.

At the side of the carriage 14 facing away from the spine 16 a follow member constituting a follow roll 19 is positioned to engage a curve-forming groove 20 of a curve cylinder 21 that is secured to the central shaft 2.

The tensioning bracket 17 further comprises an extension 22 carrying a follow roll 23. This follow roll 23 co-operates with a curve-forming groove 24 of a composite curve cylinder 25 that is secured to the central shaft 2.

In addition a lower carriage 26 is slidably mounted on each pair of vertical rods 13. A carrying handle 27 being connected to this lower carriage 26 forms together with the spine 16 and the tensioning bracket 17 a positioning and tensioning assembly and comprises an opening, into which the downwardly extending rod 15 connected to the upper carriage 14 constantly extends, while moreover an elongated rounded enlarged head 29 that is positioned at the lower end of the spine 16 and that fits into the neck-opening of the poultry, can extend through this opening. Besides, the spine 16 comprises a short bent strip 28 extending almost perpendicularly to this head 29.

The lower carriage 26 comprises at its side facing away from the carrying handle 27 a follow-roll 30 co-operating with a curve cylinder 31 that is firmly secured to the central shaft 2.

A compression spring 32 positioned around the respective rod 13 between the lower plate 12 of the cage and each lower carriage 26 causes the follow-roll 30 of said lower carriage 26 to constantly engage the co-operating curve cylinder 31.

Therefore the curve cylinders 21, 25 and 31 that are all firmly secured to the central shaft 2, are not rotatable.

The cage existing of the lower plate 12, the upper plate 11 and the rods 13 displaceable in the axial direction of the central shaft 2, is connected to the drive wheel 5 through pins 33 and therefore follows the rotation of said drive wheel 5.

A polygonal horizontal guide bracket 35 is connected to the drive wheel 5 through support plates 34, said guide bracket 35 engaging the hook 10 of the suspension conveyor, from which the poultry is suspended during the cutting operation. The number of sides of said guide bracket 35 corresponds with the number of hooks 10 that are distributed along the circumference of the drive wheel 5 and that can engage the recesses formed therein.

Moreover, two adjustable horizontal guide members 36 and 37 are secured to the frame 1 for effecting a proper supply of the poultry to the apparatus.

An extending arm 38 is mounted on the static vertical central shaft 2 below the lower horizontal plate 12 of the cage and carries an adjustable carriage 39 on which an electric motor enveloped by a cap 41 is positioned, the horizontal drive shaft thereof being connected to a rotatable cutting knife 40.

A guide plate 42 is positioned between the cap 41 enveloping the electric motor and the cutting knife 40 for guiding and discharging the cut-off top-breasts. The cap 41 further carries an adjustable guiding member 43 for holding the legs of the poultry out of reach of the rotating cutting knife 40 during the cutting operation.

The operation of the apparatus described above will be explained below.

The poultry with its ankle-joints suspended from hooks 10 of the suspension conveyor is supplied to the apparatus while the rolls 9 reach the support rail 7 of the apparatus and are moved continuously along this support rail 7.

Meanwhile the carrying handles 8 fittingly engage the recesses 6 of the drive wheel 5 whereby this drive wheel 5 is synchronously driven by the suspension conveyor.

The polygonal guide bracket 35 that is secured to the drive wheel 5 provides a stable support of the hooks 10 when passing the apparatus.

Figure 3:
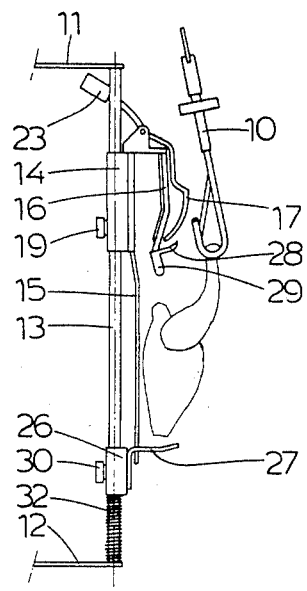
FIGS. 3–6 show different subsequent phases of positioning and tensioning poultry and cutting-off a part thereof with the apparatus according to FIGS. 1 and 2.
Figure 4:
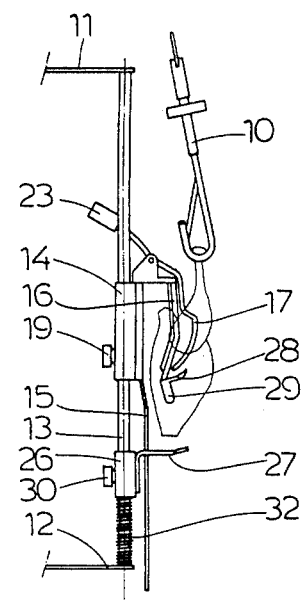

Every bird suspended from a hook 10 is positioned against the downwardly extending rod 15 of the corresponding upper carriage 14 through the horizontal guide members 36 and 37 in such way that the spine 16 together with the tensioning bracket 17 can easily be pushed into the abdominal cavity of the bird (FIGS. 3 and 4).

Dependent on the size of the bird the elongated head 29 of the spine 16, which head is rounded at its lower end will extend more or less into the neck-opening of said bird.

After the upper carriage 14 and therefore the spine 16 have been moved to their lowermost position through the follow-roll 19 engaging the curve cylinder 21, the tensioning bracket 17 is pivoted outwardly through the follow-roll 23 engaging the curve cylinder 25 and hereby engages the sternum of the bird. The preferred width of the tensioning bracket 17 lies between 20 and 40 mm.

During this action the bird is slightly deformed whereby the backbone of the bird is centred in a slot that is formed in the rearside of the spine 16 and that has a form adapted to the backbone of the bird.

In the lowermost position of the upper carriage 14 the short bent strip 28 prevents the head 29 of the spine 16 from shooting through the neck opening of the bird.

Thereafter the lower carriage 26 together with the carrying handle 27 is moved upwardly by the underlying spring 32 dependent on the displacement of the follow-roll 30.

The bird part extending at this moment below the head 29 of the spine 16 is pushed upwardly by the carrying handle 27. Meanwhile the head 29 of the spine 16 is positioned by the opening in the carrying handle 27 while the neck stub of the bird can extend through this opening.

Figure 5:
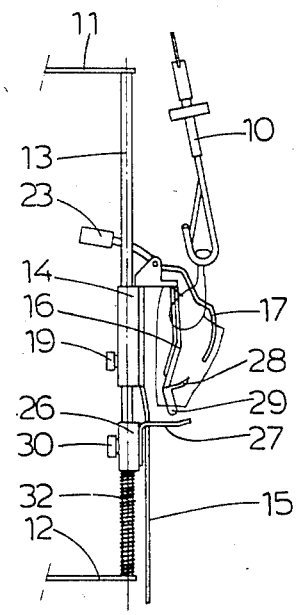
Figure 6:
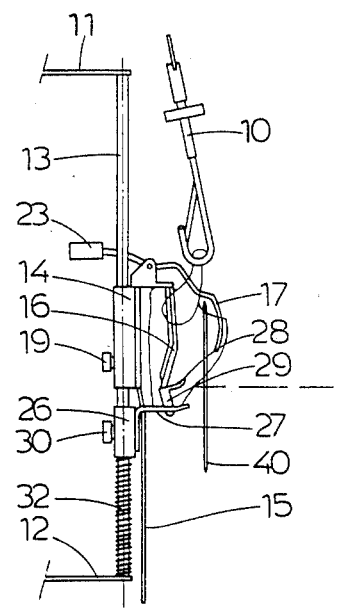

In this way an extremely stable positioning of the bird is obtained. Thereafter the tensioning bracket 27 is pivoted further outwardly in a continuous motion during the continued rotation of the cage around the static vertical central shaft 2, while the rotating cutting knife 40 is passed in the outermost or tensioning position of the tensioning bracket 27, so that the top-breast of the bird will be cut-off between the spine 16 and the tensioning bracket 17 (FIGS. 5 and 6). The cut-off top-breast is discharged through the guide plate 42 towards the desired location.

Subsequently, the lower carriage 26 will be moved downwardly again through its follow-roll 30 that co-operates with the curve cylinder 31, while the upper carriage 14 will be displaced upwardly through the follow-roll 19 and the curve cylinder 21 co-operating therewith and the tensioning bracket 17 will be pivoted back from its tensioning position to its rest position through its follow-roll 23 and the co-operating curve cylinder 21. Hereafter the positioning and tensioning assembly can be used again.

The invention is not limited to the embodiment described above, but can be varied widely within the scope of the invention.

I claim:

1. Apparatus for cutting-off a part from slaughtered poultry comprising a suspension conveyor with hooks from which the poultry is suspended by its ankle-joints, further comprising a cutting device for cutting-off said poultry part, characterized by at least one positioning and tensioning assembly synchronously movable with the suspension conveyor for positioning and tensioning the poultry in relation to the cutting device, wherein said positioning and tensioning assembly is provided with an elongated member for engaging the backbone of the poultry, means for displacing said elongated member relative to the suspension conveyor and for inserting said elongated member into the abdominal cavity of the poultry, said assembly further comprising a tensioning bracket for engaging the sternum of the poultry, means for displacing said bracket relative to the suspension conveyor and for inserting said bracket into the abdominal cavity of the poultry and means for laterally displacing the bracket laterally relative to said elongated member between a rest position and a tensioning position.

2. Apparatus according to claim 1, characterized in that the tensioning bracket is pivotably connected to the spine.

3. Apparatus according to claim 1, characterized in that the elongated member and the tensioning bracket are mounted on a carriage, means for displacing said carriage in relation to the suspension conveyor between an upper position, in which the elongated member and the tensioning bracket are out of the abdominal cavity of the poultry, and a lower position, in which the elongated member and the tensioning bracket are within said abdominal cavity.

4. Apparatus according to claim 1, characterized in that the positioning and tensioning assembly further comprises a carrying handle means for displacing said carrying handle relative to the suspension conveyor, said carrying handle having opening for receiving the neck stub of the poultry in the lowermost position of the elongated member in the lowermost position of the carriage.

5. Apparatus according to claim 4, characterized in that the carriage comprises a downwardly extending rod that continuously extends downwardly through the opening in the carrying handle.

6. Apparatus according to claim 4, characterized in that the carrying handle is mounted on a second carriage that is positioned below said carriage, means for displacing said second carriage relative to the suspension conveyor between a lower position, in which the carrying handle does not engage the poultry suspended by its ankle-joints, and an upper position, in which the carrying handle engages the lower part of the poultry.

7. Apparatus according to claim 1, characterized in that the elongated member comprises at its lower end an elongated rounded enlarged head that fits into the neck opening of the poultry as well as a short bent strip extending almost perpendicularly to said head and preventing the head of the elongated member from shooting through the neck opening of the poultry suspended by its ankle-joints when said carriage is in its lowermost position.

8. Apparatus according to claim 1, characterized in that the elongated member is conformed to the shape of the backbone of the poultry.

9. Apparatus according to claim 8, characterized in that the side of the elongated member facing the backbone of the poultry comprises a slot.

10. Apparatus according to claim 1, characterized in that the width of the tensioning bracket lies between 20 and 40 mm.

11. Apparatus according to claim 6, characterized in that means for mounting the first carriage and second carriage on a common vertical rod so said carriages are upwardly and downwardly displaceable but non-rotatable relative to this rod.

12. Apparatus according to claim 6, characterized in that said carriages comprise follow members that co-operate with curves for effecting the vertical displacements of the carriages along the rod.

13. Apparatus according to claim 12, characterized in that a spring urges said second carriage upwardly and holds the follow member thereof in engagement with the corresponding curve.

14. Apparatus according to claim 2, characterized in that the tensioning bracket comprises a follow member, that co-operates with a curve for effecting the pivotal motion of the tensioning bracket relative to the elongated member.

15. Apparatus according to claim 11, wherein a cage is jounalled on a static, vertical, central shaft, so as to be non-displaceable in vertical direction relative to this shaft, said cage consisting of a lower horizontal plate and an upper horizontal plate that are connected to each other through a number of said vertical rods, wherein moreover a drive wheel is jounalled on this vertical central shaft, said wheel being drivable through the suspension conveyor, wherein the rotation of the drive wheel is followed by the cage, characterized in that a horizontal guide bracket that is secured to the drive wheel engages the hook of the suspension conveyor from which the poultry is suspended during the cutting operation.

16. Apparatus according to claim 15, characterized in that the guide bracket is polygonally shaped.

17. Apparatus according to claim 15 or 16, characterized in that the cage carries at least one further horizontal guide member for positioning the poultry suspended on its ankle-joints against the downwardly extending rod that is connected to the first mentioned carriage.

18. Apparatus according to claim 15, characterized in that an extending arm is secured to the central vertical shaft, said arm supporting an adjustable carriage that carries an electric motor driving the cutting device through a horizontal drive shaft, said cutting device being shaped as a cutting knife.

19. Apparatus according to claim 18, characterized in that the position of the cutting knife relative to the positioning and tensioning assembly in its cutting position is such that the cutting knife contacts the poultry suspended on its ankle-joints in a cutting-engagement between the spine and tensioning bracket positioned in the poultry, while said bracket is in its tensioning position.

20. Apparatus according to claim 18 or 19, characterized in that a guide plate for discharging the cut-off poultry part extends adjacent to the cutting knife.

21. Apparatus according to claim 18, characterized in that an adjustable guiding member is positioned above the electric motor for holding the legs of the poultry out of reach of the cutting knife during the cutting operation.

* * * * *